US007802189B2

(12) United States Patent  (10) Patent No.: US 7,802,189 B2
Jiang et al.  (45) Date of Patent: Sep. 21, 2010

(54) USER INTERFACE DESIGN FOR TELECOMMUNICATIONS SYSTEMS

(75) Inventors: Baofeng Jiang, Pleasanton, CA (US);
Jerold D. Osato, Pinole, CA (US);
Xidong Wu, Livermore, CA (US);
Raghbendra G. Savoor, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 2339 days.

(21) Appl. No.: 10/288,225

(22) Filed: Nov. 5, 2002

(65) Prior Publication Data

US 2004/0085349 A1  May 6, 2004

(51) Int. Cl.
*G06F 3/00* (2006.01)
(52) U.S. Cl. .................. 715/736; 715/731; 715/735; 715/739; 715/853
(58) Field of Classification Search ......... 715/733–739, 715/853–858
See application file for complete search history.

(56) References Cited

U.S. PATENT DOCUMENTS

| 5,726,979 | A |  | 3/1998 | Henderson et al. |
| 5,774,655 | A | * | 6/1998 | Bloem et al. ................ 709/220 |
| 5,832,069 | A | * | 11/1998 | Waters et al. .......... 379/115.01 |
| 5,870,558 | A |  | 2/1999 | Branton, Jr. et al. |
| 6,058,103 | A |  | 5/2000 | Henderson et al. |
| 6,111,561 | A | * | 8/2000 | Brandau et al. ............. 715/781 |
| 6,115,743 | A | * | 9/2000 | Cowan et al. ................ 709/224 |
| 6,205,495 | B1 | * | 3/2001 | Gilbert et al. .................. 710/8 |
| 6,208,345 | B1 | * | 3/2001 | Sheard et al. ................ 715/853 |
| 6,259,679 | B1 |  | 7/2001 | Henderson et al. |
| 6,285,688 | B1 |  | 9/2001 | Henderson et al. |
| 6,343,290 | B1 | * | 1/2002 | Cossins et al. ................. 707/10 |
| 6,611,867 | B1 | * | 8/2003 | Bowman-Amuah ......... 709/224 |
| 6,615,166 | B1 | * | 9/2003 | Guheen et al. ................ 703/27 |
| 6,754,181 | B1 | * | 6/2004 | Elliott et al. ................. 370/252 |
| 7,225,250 | B1 | * | 5/2007 | Harrop ........................ 709/224 |
| 7,493,562 | B2 | * | 2/2009 | Kui et al. ..................... 715/736 |
| 2002/0029168 | A1 | * | 3/2002 | McConnell et al. ........... 705/26 |
| 2002/0078131 | A1 | * | 6/2002 | Dowd et al. ................. 709/201 |
| 2002/0087671 | A1 | * | 7/2002 | Weisser et al. .............. 709/223 |
| 2002/0094798 | A1 | * | 7/2002 | Nurminen et al. ........... 455/403 |
| 2002/0152305 | A1 | * | 10/2002 | Jackson et al. .............. 709/224 |
| 2002/0158899 | A1 | * | 10/2002 | Raymond .................... 345/736 |
| 2002/0161848 | A1 | * | 10/2002 | Willman et al. ............. 709/213 |
| 2002/0169700 | A1 | * | 11/2002 | Huffman et al. ............... 705/35 |
| 2004/0135804 | A1 | * | 7/2004 | Pellaz et al. ................. 345/734 |
| 2004/0267729 | A1 | * | 12/2004 | Swaminathan et al. ......... 707/3 |
| 2009/0074411 | A1 | * | 3/2009 | Bernard et al. ................ 398/58 |

FOREIGN PATENT DOCUMENTS

WO   WO 00/17763   3/2000

\* cited by examiner

*Primary Examiner*—Ryan F Pitaro
(74) *Attorney, Agent, or Firm*—Toler Law Group

(57) ABSTRACT

The present invention relates generally to a user interface design for telecommunication systems. In a particular embodiment, the user interface includes a first level interface organized by data communications network technology area and a second level interface grouped by operational function. The first level interface identifies a plurality of different data communications network technologies. Each of a plurality of operational functions identified by the second level interface includes a summary view and a detailed functional view. Each summary view is organized as a drill down view based on a set of view detail levels.

20 Claims, 3 Drawing Sheets

USER INTERFACE DESIGN FOR TELECOMMUNICATIONS SYSTEMS

BACKGROUND

1. Field of the Invention

The present invention relates generally to a user interface design for telecommunications systems.

2. Description of the Related Art

Many software tools are used for the management of telecommunications networks. Many of such tools are dependent on the details of a particular equipment vendor's product. Others are specific to a particular function to be performed. While function specific and vendor dependent tools may be used, it would be desirable to provide an improved user interface that may be used by a network operator to perform a broad range of network management functions and that is independent of any specific vendor or technology.

Accordingly, there is a need for an improved network management user interface.

SUMMARY

A particular aspect of the present invention is directed to a user interface to a network operations support system. In a particular embodiment, the user interface includes a first level interface organized by data communications network technology area and a second level interface grouped by operational function. The first level interface identifies a plurality of different data communications network technologies. Each of a plurality of operational functions identified by the second level interface includes a summary view and a detailed functional view. Each summary view is organized as a drill down view based on a set of view detail levels.

In another embodiment, a method of displaying data via a user interface to a network operations support system is disclosed. The method includes displaying a first level view and displaying a second level view grouped by operational function. The first level view is organized by data communications network technology area and identifies a plurality of different data communications network technologies. Each operational function displayed in the second level view includes a summary view and a detailed functional view. Each summary view is organized as a drill down view based on a set of detail levels.

BRIEF DESCRIPTION OF THE DRAWINGS

The use of the same reference symbols in different drawings indicates similar or identical items.

DETAILED DESCRIPTION OF THE DRAWINGS

Figure 1:
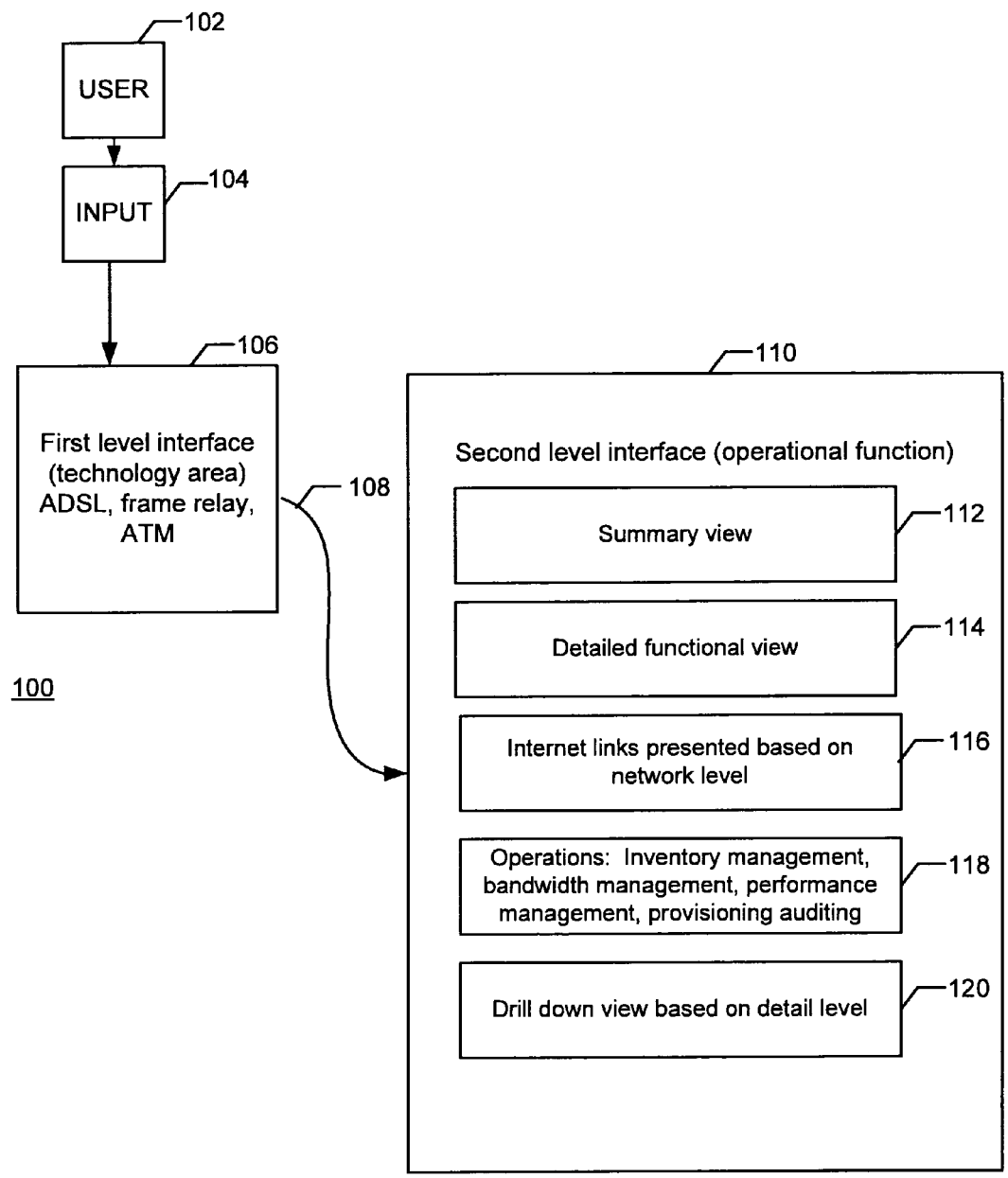
FIG. 1 is a block diagram of a user interface design for telecommunications system.

Referring to FIG. 1, a user interface 100 is disclosed. The user interface 100 includes a first level interface 106 and a second level interface 110. The first level interface 106 includes a plurality of different available technology areas such as asymmetric digital subscriber loop (ADSL), frame relay, and asynchronous transfer mode (ATM). The first level interface 106 is responsive to a user 102 via input 104. The first interface level 106 is coupled to the second level interface 110 via link 108. The second level interface 110 is an operational functional interface that includes a plurality of different views. The second level interface 110 includes a summary view 112, a detailed functional view 114, operations view 118, and a drill down view based on detail level 120. Internet links 116 are presented based on the particular network levels (e.g., regional or pinpoint). The operations view 118 includes a variety of available operations that may be performed, including inventory management, bandwidth management, performance management and provisioning auditing. A user 102, via an input command, may traverse between the first level interface 106 and the second level interface 110.

Figure 2:
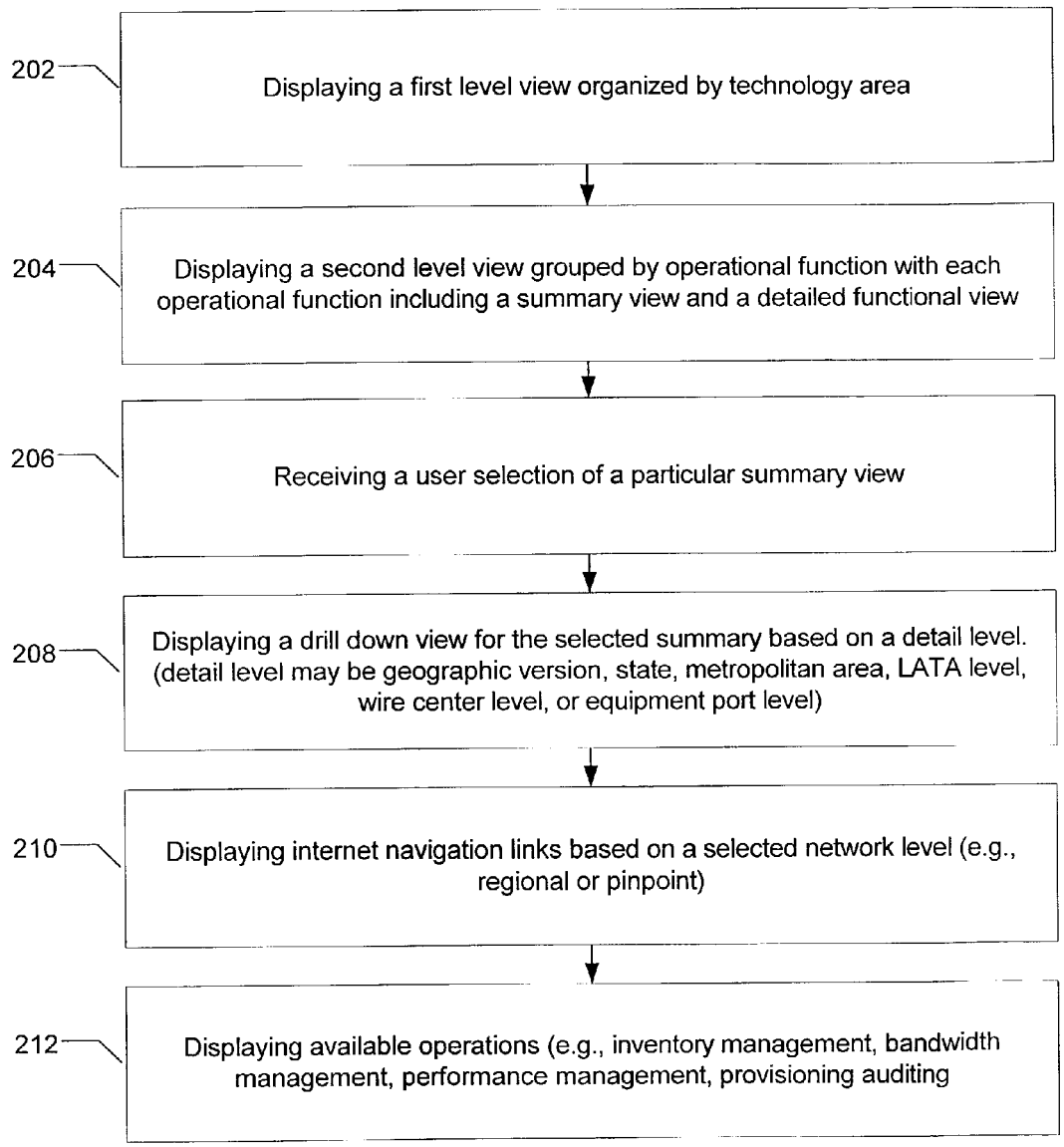
FIG. 2 is a flow chart that illustrates a method of using an illustrative user interface.

Referring to FIG. 2, a method of using an illustrative user interface shown. A first level view that is organized by technology is displayed, at 202. A second level view grouped by operational function is displayed at 204. The operational function view includes a summary view and a detailed summary view. A user selection is received in response to a particular summary view at 206. After the user selection, a drill down view for the selected summary portion is displayed at a detailed level. The detail level may include geographic version, a particular state, metropolitan area, LATA level, wire center level, or equipment port level at 208. Internet navigation links based on a selected network level are displayed, at 210. An example of a network level is a regional level or a detailed pinpoint level. Available operations are then displayed at 212. Examples of available operations include inventory management, bandwidth management, performance management and provisioning auditing.

Figure 3:
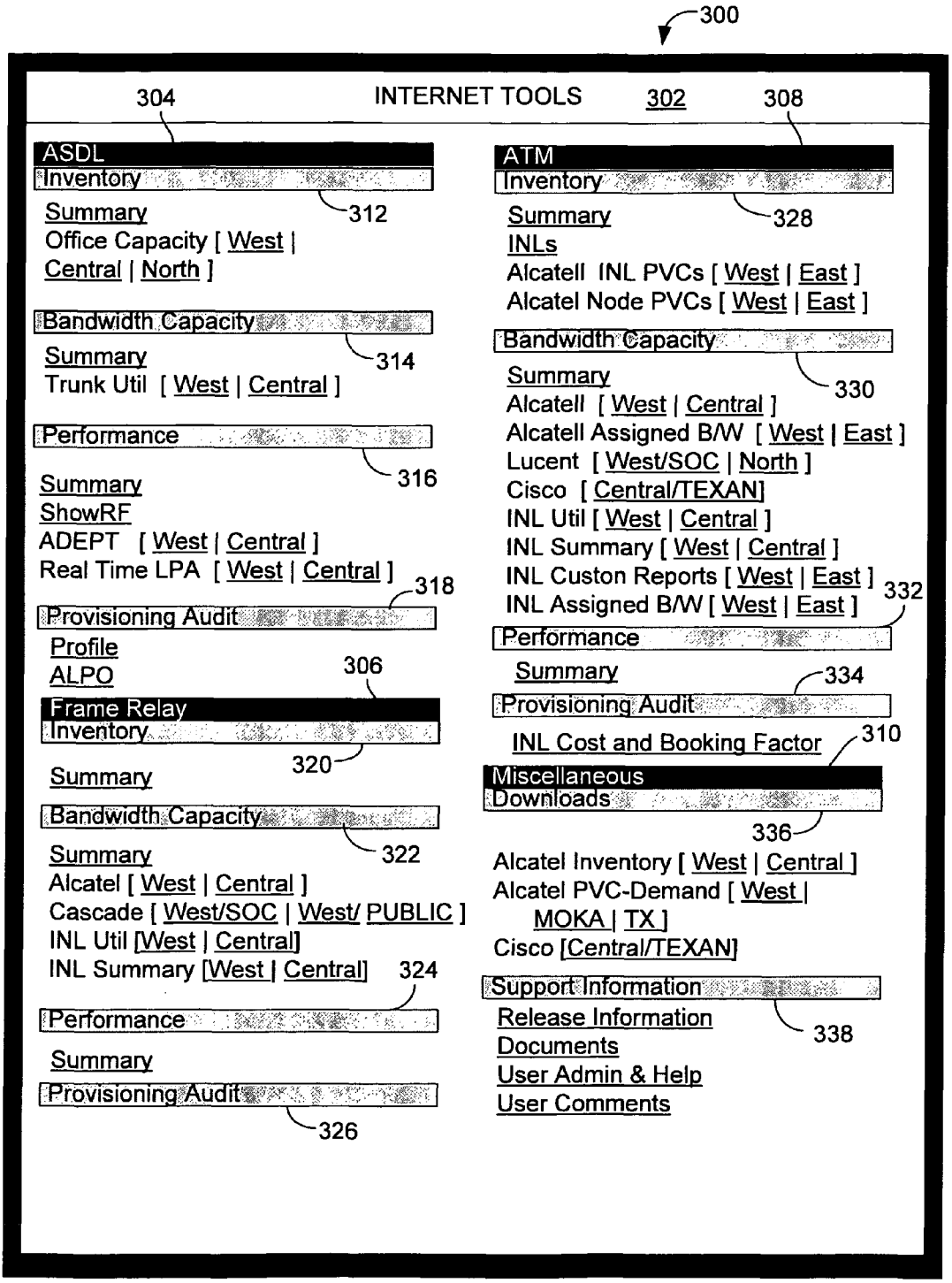
FIG. 3 is an illustrative screen shot of a user interface.

Referring to FIG. 3, the illustrative screen shot 300 of a user interface 302 that includes first level views 304, 306, 308 and 310 based on technology areas and links to second level views 312-338 that include summary and other operational capabilities is illustrated. The user interface 302 illustrated in FIG. 3 is organized by technology area and is vendor independent. The user interface 302 provides for multiple subsystems and allows users to easily cross technology areas without the need to deal with distinct interfaces for each specific technology. Thus, a set of unified operational tools that is applicable across different network technologies has been integrated into a single user interface 302. The user interface 302 may be displayed at a plurality of different terminals, and in one particular implementation, the user interface 302 utilizes the distribution capabilities of the Internet.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a user terminal capable of generating a display, the display including:
   a user interface comprising:
   a first level interface organized by data communications network technology area, the first level interface identifying a plurality of different data communications network technologies; a second level interface grouped by operational function, each operational function including a summary view and a detailed functional view, the second level interface identifying a plurality of different operational functions; and wherein each summary view is organized as a drill down view based on a set of view detail levels.

2. The system of claim 1, wherein the detailed functional view comprises a set of view detail levels inc-hides including a geographic region level, a state or metropolitan area level, a local access transport area (LATA) level, a wire center level, and an equipment port level.

3. The system of claim 2, wherein at each view detail level of the set of view detail levels, a user is presented with internet navigation links based on a particular network level.

4. The system of claim 3, wherein the particular network level include includes a regional level and a pinpoint level.

5. The system of claim 1, wherein the user interface is associated with a network operations support system that has access to a plurality of different network analysis subsystems.

6. The system of claim 5, wherein the first level interface is independent of any particular vendor.

7. The system of claim 1, wherein the plurality of different data communication communications network technologies includes asymmetric digital subscriber line (ADSL), frame relay, Ethernet, and asynchronous transfer mode (ATM) technologies.

8. The system of claim 1, wherein the operational function is selected from a function within the group consisting of inventory management, bandwidth management, performance management, and provisioning auditing.

9. A method of displaying data via a user interface to a network operations support system, the method comprising:
  displaying a first level view, the first level view organized by data communications network technology area, the first level view identifying a plurality of different data communications network technologies; and
  displaying a second level view grouped by operational function, each operational function including a summary view and a detailed functional view, the second level view identifying a plurality of different operational functions, wherein each summary view is organized as a drill down view based on a set of detail levels.

10. The method of claim 9, wherein the detailed functional view comprises a set of detail levels including a geographic region level, a state or metropolitan area level, a local access transport area (LATA) level, a wire center level, and an equipment port level.

11. The method of claim 10, further comprising displaying interne navigational links based on a selected network level.

12. The method of claim 11, wherein the selected network level is one of a regional level and a pinpoint level.

13. The method of claim 9, wherein the network operations support system has access to a plurality of different network analysis subsystems.

14. The method of claim 9, wherein the first level view is independent of any particular communication equipment vendor.

15. The method of claim 9, wherein the plurality of different data communications network technologies includes digital subscriber line (DSL), frame relay, Ethernet, and asynchronous transfer mode (ATM) technologies.

16. The method of claim 9, further comprising displaying a set of operational functions including inventory management, bandwidth management, performance management, and provisioning auditing.

17. A system comprising:
  a user terminal capable of generating a display, the display including:
  a user interface, the user interface comprising: a first level view identifying a plurality of network technologies and organized by network technology area; and a second level view identifying operations information associated with each network technology area, the second level view organized into sub-categories of one or more operational functions.

18. The system of claim 17, wherein the operations information comprises a summary view of each operational function associated with the network technology area.

19. The system of claim 17, wherein the operations information comprises an operational capability associated with at least one of the one or more operational functions.

20. The system of claim 19, wherein the operations information further comprises network levels further subcategorized by geographic area.

\* \* \* \* \*

UNITED STATES PATENT AND TRADEMARK OFFICE
CERTIFICATE OF CORRECTION

PATENT NO. : 7,802,189 B2
APPLICATION NO. : 10/288225
DATED : September 21, 2010
INVENTOR(S) : Baofeng Jiang et al.

Page 1 of 1

It is certified that error appears in the above-identified patent and that said Letters Patent is hereby corrected as shown below:

On the Title Page, Item (75) Inventors: "Baofeng Jiang, Pleasanton, CA (US); Jerold D. Osato, Pinole, CA (US); Xidong Wu, Livermore, CA (US); Raghbendra G. Savoor, Walnut Creek, CA (US)" should read --Baofeng Jiang, Pleasanton, CA (US); Jerold D. Osato, Pinole, CA (US); Xidong Wu, Livermore, CA (US); Raghvendra G. Savoor, Walnut Creek, CA (US)--.

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 7,802,189 B2  
APPLICATION NO. : 10/288225  
DATED : September 21, 2010  
INVENTOR(S) : Jiang et al.

Page 1 of 1

It is certified that error appears in the above-identified patent and that said Letters Patent is hereby corrected as shown below:

Title Page,

Item (75), Inventors, "Raghvendra" (as corrected to read in the Certificate of Correction issued October 7, 2014) is deleted and patent is returned to its original state with fourth inventor first name in patent to read -- Raghbendra --.

Signed and Sealed this  
Twentieth Day of January, 2015

Michelle K. Lee  
*Deputy Director of the United States Patent and Trademark Office*